(12) United States Patent
Skidmore

(10) Patent No.: US 9,787,167 B2
(45) Date of Patent: Oct. 10, 2017

(54) OSCILLATING MOTOR FOR A PERSONAL CARE APPLIANCE

(71) Applicant: L'Oreal, Paris (FR)

(72) Inventor: Joseph Eric Skidmore, Issaquah, WA (US)

(73) Assignee: L'Oreal, Paris (FR)

( * ) Notice: Subject to any disclaimer, the term of this patent is extended or adjusted under 35 U.S.C. 154(b) by 340 days.

(21) Appl. No.: 14/588,052

(22) Filed: Dec. 31, 2014

(65) Prior Publication Data
US 2016/0190902 A1   Jun. 30, 2016

(51) Int. Cl.
| | |
|---|---|
| H02K 33/00 | (2006.01) |
| A46B 13/00 | (2006.01) |
| A46B 13/02 | (2006.01) |
| H02K 33/16 | (2006.01) |

(52) U.S. Cl.
CPC .......... *H02K 33/00* (2013.01); *A46B 13/008* (2013.01); *A46B 13/02* (2013.01); *H02K 33/16* (2013.01); *A46B 2200/102* (2013.01); *A46B 2200/1006* (2013.01)

(58) Field of Classification Search
CPC ............................... H02K 33/00; H02K 33/16
USPC .................................. 310/15, 17, 20, 36, 37
See application file for complete search history.

(56) References Cited

U.S. PATENT DOCUMENTS

| | | | | |
|---|---|---|---|---|
| 3,493,793 A * | 2/1970 | Niemela | ................ | H02K 33/06 15/22.1 |
| 5,189,751 A * | 3/1993 | Giuliani | ................ | A61C 17/20 15/22.1 |
| 6,453,498 B1 * | 9/2002 | Wu | ........ | A61C 17/40 15/22.1 |
| 7,067,945 B2 * | 6/2006 | Grez | .................. | A61C 17/3418 15/22.1 |
| 7,157,816 B2 * | 1/2007 | Pilcher | ................... | H02K 33/16 310/36 |
| 7,786,626 B2 * | 8/2010 | Reishus | ................. | H02K 33/16 15/22.1 |
| 8,304,938 B2 * | 11/2012 | Jungnickel | ......... | A61C 17/3418 15/22.1 |
| 2009/0243405 A1 * | 10/2009 | Luo | .................... | A61C 17/3418 310/38 |
| 2012/0110764 A1 * | 5/2012 | Nanda | ................ | A46B 15/0002 15/105 |
| 2013/0200823 A1 * | 8/2013 | Chan | ..................... | B26B 19/284 318/3 |
| 2016/0190902 A1 * | 6/2016 | Skidmore | ............. | H02K 33/00 310/36 |

FOREIGN PATENT DOCUMENTS

| | | |
|---|---|---|
| DE | 31 26 506 A1 | 1/1983 |
| EP | 2 246 009 A1 | 11/2010 |

OTHER PUBLICATIONS

International Search Report and Written Opinion mailed Mar. 18, 2016, issued in corresponding International Application No. PCT/US2015/067141, filed Dec. 21, 2015, 10 pages.

* cited by examiner

*Primary Examiner* — John K Kim
(74) *Attorney, Agent, or Firm* — Christensen O'Connor Johnson Kindness PLLC

(57) ABSTRACT

An oscillating motor suitable for use with a personal care appliance is provided. The oscillating motor is configured with a reduced motor envelope as compared to conventional motors in order to be suitable for personal care appliances with smaller handles.

17 Claims, 10 Drawing Sheets

OSCILLATING MOTOR FOR A PERSONAL CARE APPLIANCE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, an oscillating motor is provided for a personal care appliance. The oscillating motor includes a stator configured to be connectable to a source of alternating current, an armature configured to move about an axis in response to receipt of alternating current by the stator, an armature mount, a first flexure element having a first end mounted to the armature and a second end mounted to the armature mount, and a second flexure element having a first end mounted to the armature and a second end mounted to the armature mount. The first flexure element and the second flexure element are coupled between the armature and the armature mount such that the armature moves in an arcuate path about the axis. In an embodiment, the first flexure element and the second flexure element are overlapped in an X configuration to form an angle between the first end of the first flexure element and the first end of the second flexure element. The angle in one embodiment is between about 55 degrees and about 60 degrees. In one embodiment, the first flexure element and the second flexure element each have an effective length (L), wherein the first flexure element crosses the second flexure element at a position that is greater than about 0.8*length (L) of each flexure element.

In accordance with another aspect of the present disclosure, an oscillating motor is provided for a personal care appliance. The personnel care appliance has a battery, a drive circuit disposed on a printed circuit board and coupled to the battery. The oscillating motor includes a stator configured to be connectable to the drive circuit for receiving alternating current therefrom, an armature configured to move about an axis in response to receipt of alternating current by the stator, an armature mount including a cross member and first and second extensions, wherein the first extension includes an opening configured to retain at least a portion of the battery and wherein the second extension includes a notch configured to receive a portion of the personal care appliance. The oscillating motor also includes a first flexure element having a first end mounted to the armature and a second end mounted to the armature mount; and a second flexure element having a first end mounted to the armature and a second end mounted to the armature mount. The first flexure element and the second flexure element are coupled between the armature and the armature mount such that the armature moves in an arcuate path about the axis. In one embodiment, the first flexure element and the second flexure element are overlapped in an X configuration to form an angle between the first end of the first flexure element and the first end of the second flexure element, wherein the angle is between about 55 degrees and about 60 degrees, the first flexure element and the second flexure element each having an effective length (L), wherein the first flexure element crosses the second flexure element at a position that ranges from about 0.8 L to about 0.9 L of each flexure element.

In accordance with another aspect of the present disclosure, a personal care appliance is provided. The appliance includes a handle having a longitudinal axis, a workpiece attachment interface parallel with the longitudinal axis of the handle, and an oscillating motor mounted in the handle and configured to impart an oscillating motion on the workpiece attachment interface. The oscillating motor defines a motor envelope. The appliance also includes a battery positioned within the motor envelope and a printed circuit board having a drive circuit coupled to the battery and configured to provide power to the oscillating motor, wherein the printed circuit board is positioned within the oscillating motor envelope.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
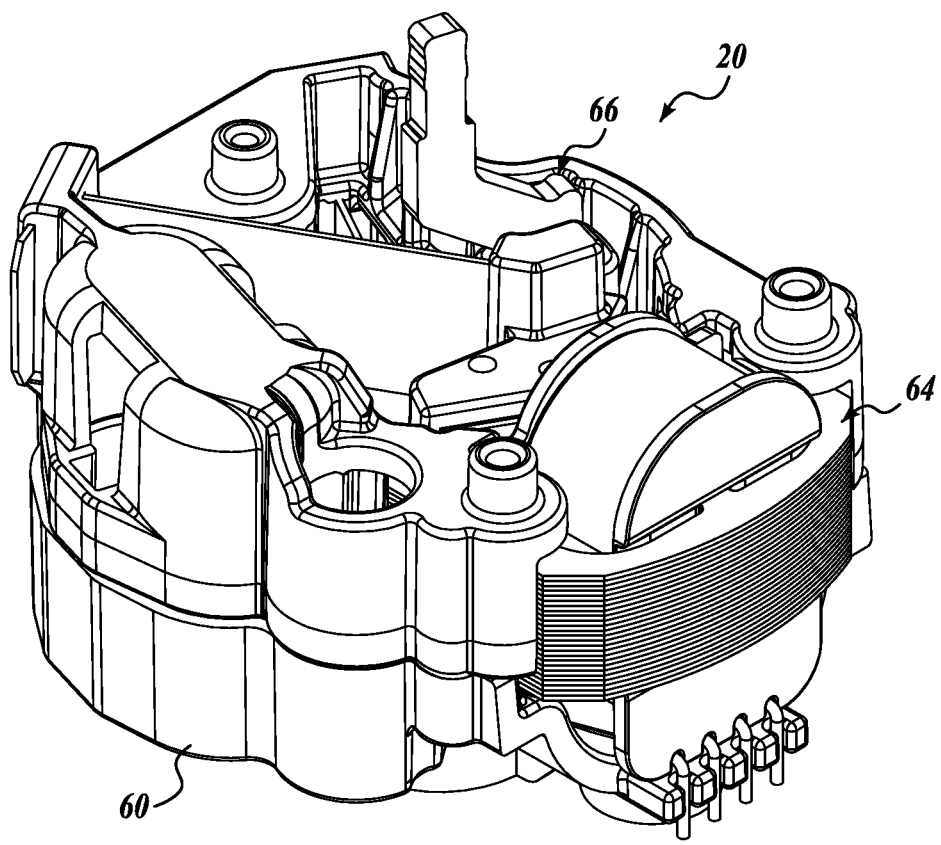
FIG. 1 is an isometric view of one representative embodiment of an oscillating motor in accordance with an aspect of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure relates generally to electric motors suitable for use in a personal care appliance. Generally described, personal care appliances typically use an electric motor to produce a particular workpiece movement/action, which in turn produces desired functional results. Examples of such appliances include power skin brushes, power toothbrushes and shavers, among others. In some currently available personal care appliances, the electric motor produces an oscillating (back and forth) action rather than a purely rotational movement. Examples of such oscillating motors are disclosed in U.S. Pat. No. 7,786,626, or commercially available in Clarisonic® branded products, such as the Aria or the Mia personal skincare product. The disclosures of U.S. Pat. No. 7,786,626, and the Clarisonic® branded products are expressly incorporated by reference herein.

While such Clarisonic® branded products are designed with a handle portion disposed orthogonal to the workpiece attachment portion, other designs are desired in the industry.

Such designs include ever decreasing handle sizes, "bullet" shaped handles (e.g., handles with the oscillation axis being parallel to or coaxial with the product handle), etc. However, as handles get smaller, conventional drive systems tend to not work as well to produce the desired workpiece movement.

To that end, the following discussion provides embodiments of oscillating motors that compensate for the effects on, for example, the natural resonant frequency of the device, available space, etc., caused by configuration changes, namely dimensional, in the handle in order to maintain a desired level of motor efficiency and workpiece movement. As will be described in more detail below, the oscillating motor in one embodiment is configured and arranged to be mounted within a small form factor handle (e.g., a small footprint). In one embodiment, the oscillating motor can provide the similar oscillation amplitude and shear as the prior art device of U.S. Pat. No. 7,786,626 but with substantially reduced size. In many of the embodiments set forth herein, the oscillating action generated by the oscillating motor may be rotational, translational, or a combination thereof.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Turning now to FIG. 1, there are shown a top isometric view of one embodiment of an oscillating electric motor, generally designated 20, formed in accordance with an aspect of the present disclosure. The motor 20 is suitable for use with a personal care appliance, such as appliance 22 illustrated in FIG. 2, for providing oscillating motive force or torque to a workpiece, such as a brush head 28. As will be described in more detail below, the oscillating motor 20 is configured with a reduced motor envelope ME (see FIG. 5C) as compared to conventional motors, such as the motor described in U.S. Pat. No. 7,786,626, in order to be suitable for personal care appliances with smaller handles, such as the handle shown in FIG. 7. The configuration of one embodiment of the oscillating motor provides, among other things, additional space for various associated components of the appliance 22.

Figure 2:
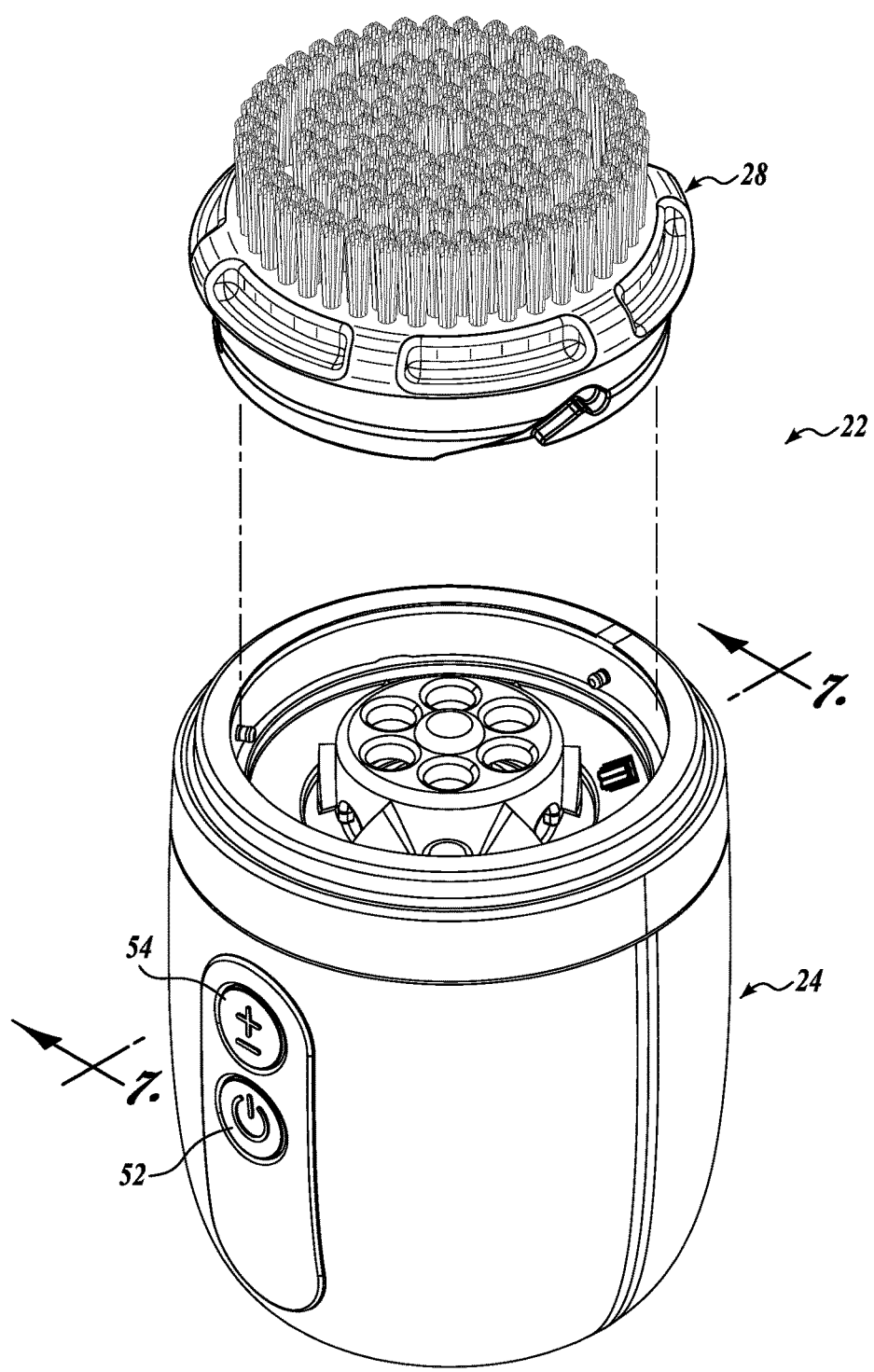
FIG. 2 is an exploded isometric view of one embodiment of a personal care appliance, which may incorporate the oscillating motor of FIG. 1.
Figure 3:
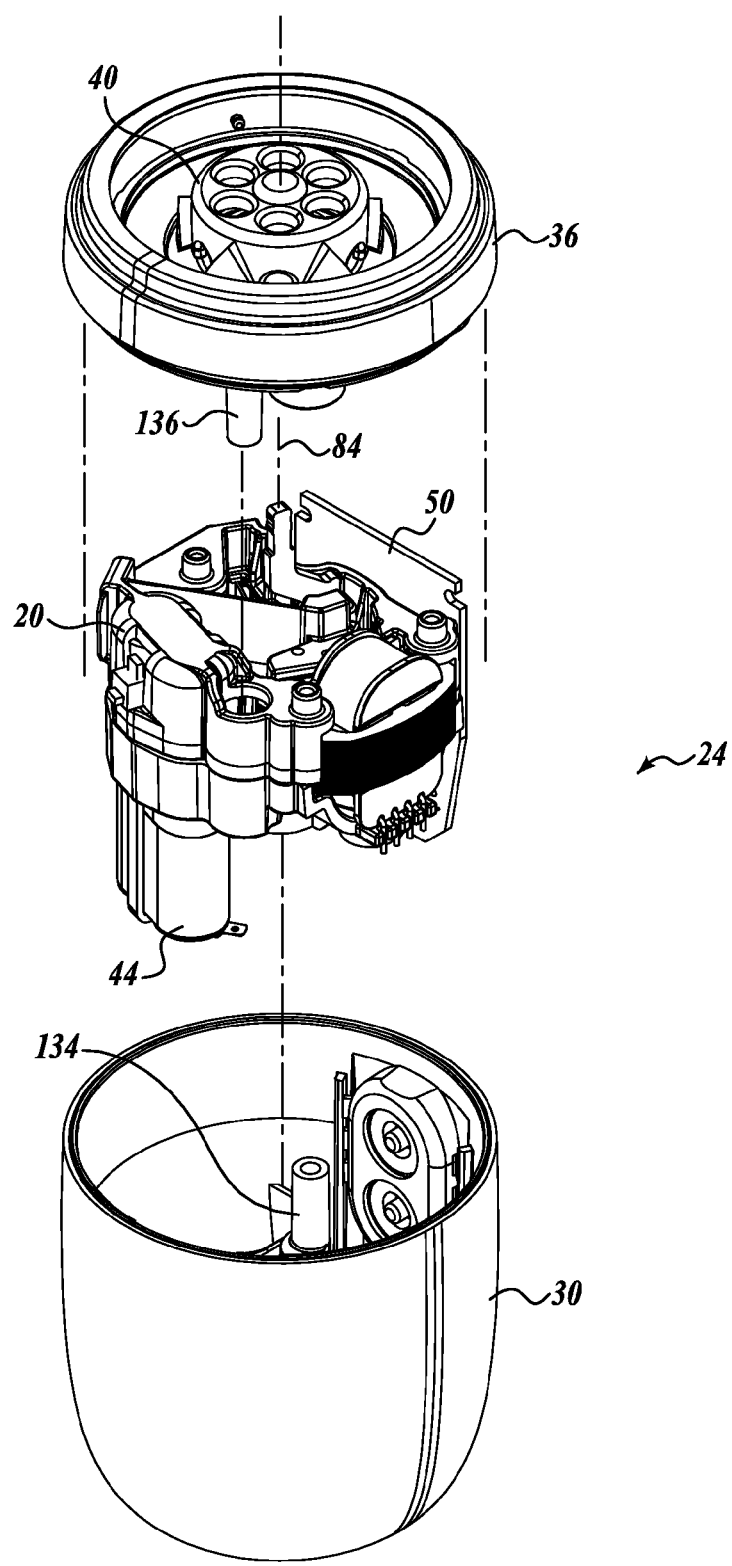
FIG. 3 is an exploded isometric view of one embodiment of a handle of the personal care appliance of FIG. 2.

FIG. 2 is a perspective view of one representative embodiment of a personal care appliance 22 formed in accordance with an aspect of the present disclosure. FIG. 3 is an exploded view of the handle of the personal care appliance 22 of FIG. 2. As shown in FIGS. 2 and 3, the personal care appliance 22 includes a handle 24 detachably coupled to a workpiece, such as brush head 28. As shown in FIG. 3, the handle 24 includes the oscillating motor 20, a handle base 30, and a handle top 36. A workpiece mount 40 is also included, and is coupled to the oscillating motor 20 for movement thereby. In one embodiment, the workpiece mount 40 together with the handle top 36 are configured to be detachably coupled to the brush head 28. The workpiece is shown as a brush head in the embodiment of FIG. 2, but can alternatively include a composition applicator, an exfoliating disc, shaving head, etc. Once attached, the workpiece in one embodiment is oriented coaxially with the handle 24.

Figure 4:
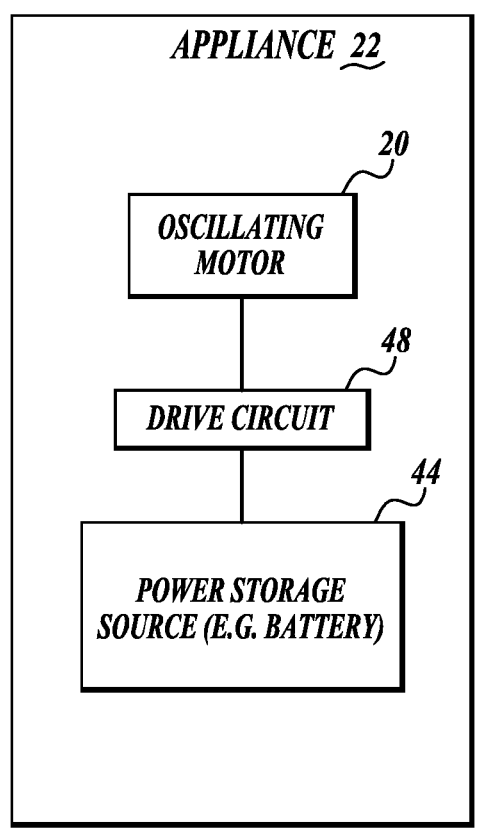
FIG. 4 is a functional block diagram of several components of the personal care appliance of FIG. 2.
Figure 7:
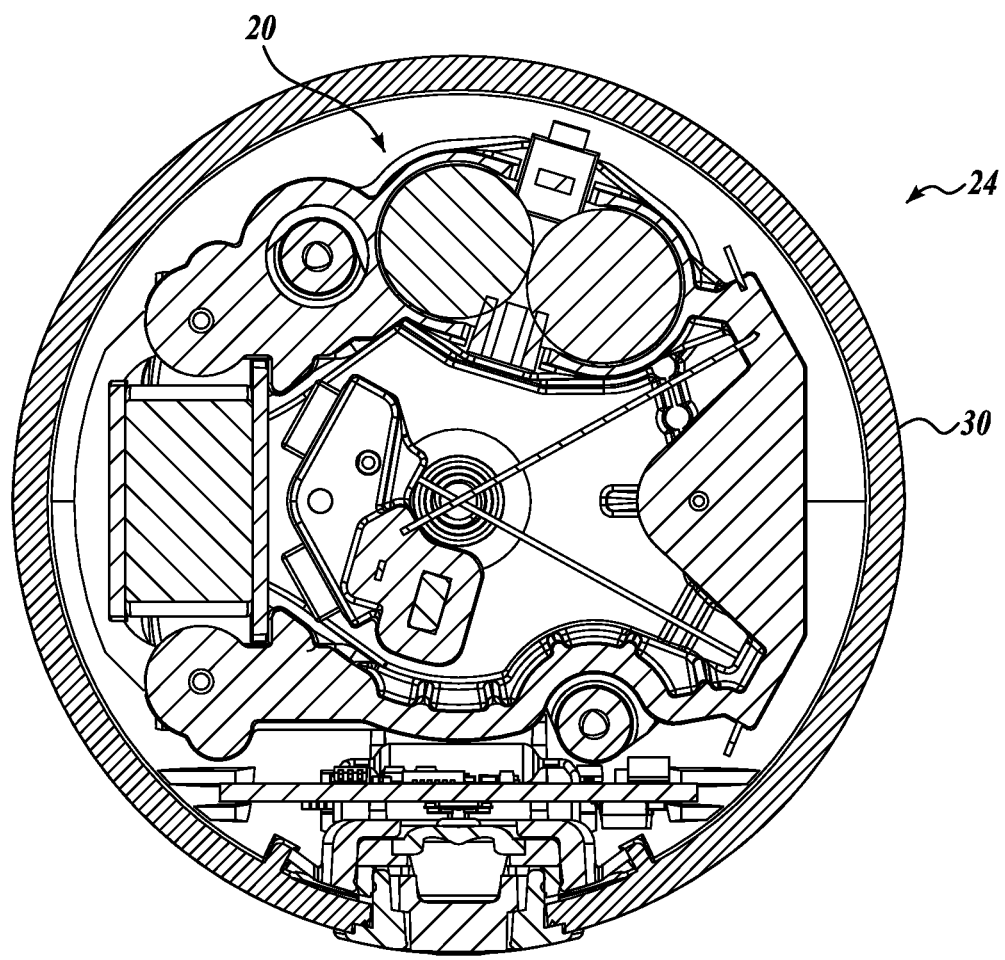
FIG. 7 is a cross sectional view of the personal care appliance taken along lines 7-7 in FIG. 2.

The handle base 30 is generally cylindrical in one embodiment, and houses the operating structure of the appliance, as shown in FIG. 7. In one embodiment, the handle base 30 is about two (2) inches in diameter or less. As shown in block diagrammatic form in FIG. 4, the operating structure in one embodiment includes the oscillating motor 20, a power storage source, such as a battery 44, and a drive circuit 48 configured and arranged to selectively generate alternating current at a selected duty cycle from power stored in the battery 44 and deliver alternating current to the oscillating motor 20. In this embodiment, the drive circuit 48 can include an on/off button 52 (See FIG. 2) and optionally includes power adjust or mode control button 54 (See FIG. 2) coupled to control circuitry, such as a programmed microcontroller or processor, which is configured to control the delivery of alternating current to the oscillating motor 20.

Turning now to FIGS. 1, 5A-5D, and 6A-6C, one representative embodiment of the oscillating motor 20 will now be described in more detail. As shown in FIGS. 1, 5A-5D, and 6A-6C, the oscillating motor 20 includes a motor base 60, a stator 64, and an armature assembly 66. The stator 64, sometimes referred to as an electromagnet or field magnet, is mounted against movement between the armature assembly 66 and the motor base 60. In the embodiment shown, the stator 64 includes an E-core 70 having a center leg 72 upon which a stator coil 74 is wound and two outer legs 76 and 78. In the embodiment shown, the coil is configured with a condensed winding and the center leg 72 is shorter than the two outer legs 76 and 78 (See FIG. 5D). In one embodiment, the width SW of the E-core 70 is about one (1) inch and the length SL of the E-Core is about 0.75 inches. In another embodiment, the width SW of the E-core 70 is about one (1) inch, the length SL of the E-Core is about 0.75 inches, the length of the outer legs is about 0.625 inches, and the length of the center leg is about 0.4 inches.

As assembled, the coil 74 is connected to a source of alternating current, such as the battery powered drive circuit 48. In operation, the coil 74 generates a magnetic field of reversing polarity when alternating current is passed through the coil 74 and around center leg 72.

Referring now to FIGS. 5A-5D, the armature assembly 66 includes a somewhat curved armature 80 mounted for movement about an axis 82. The armature 80 includes a back iron 84, which is made from a ferromagnetic material. Two or more spaced magnets 86 and 88 are magnetically coupled to the back iron 84, with magnetization in the radial direction. The magnets 86 and 88 are arranged such that the north pole of one magnet 86 faces outwardly while the north pole of the other magnet 88 faces inwardly. It should be understood, however, that the orientation could be reversed as long as the magnet poles point in opposite directions. In the embodiment shown, the armature 80 includes two surfaces disposed at an angle to one another onto which the two or more magnets 86 and 88 are mounted. As assembled, the position and orientation of the magnets 86 and 88 are such that a line normal to the face of the magnets passing through the midpoint of the magnet face also passes through the axis 82.

Figure 5A:
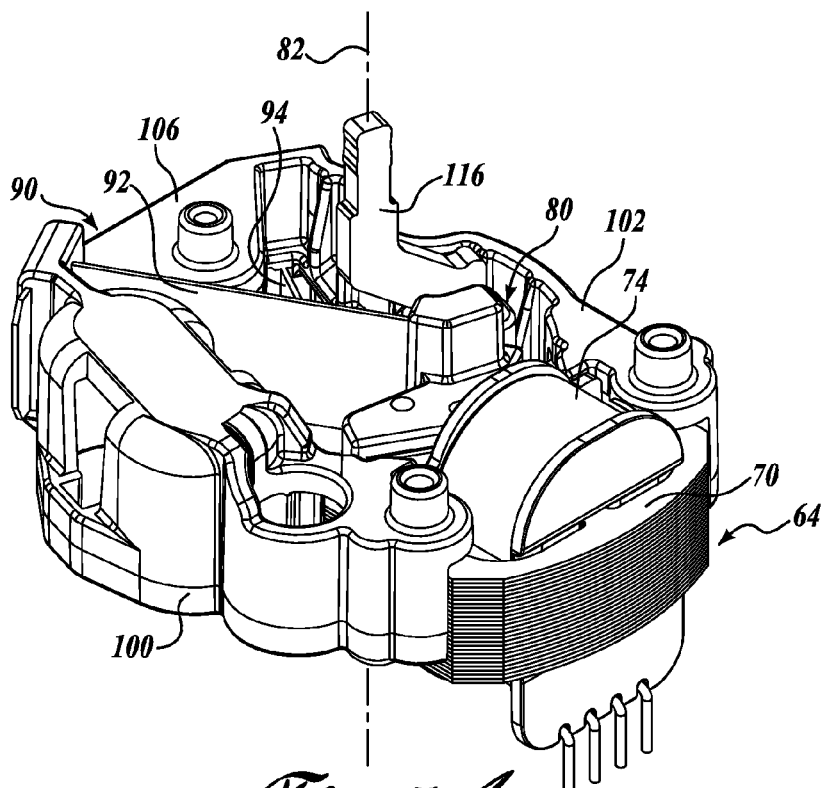
FIGS. 5A-5D illustrate selected components of the oscillating motor of FIG. 1.
Figure 5B:
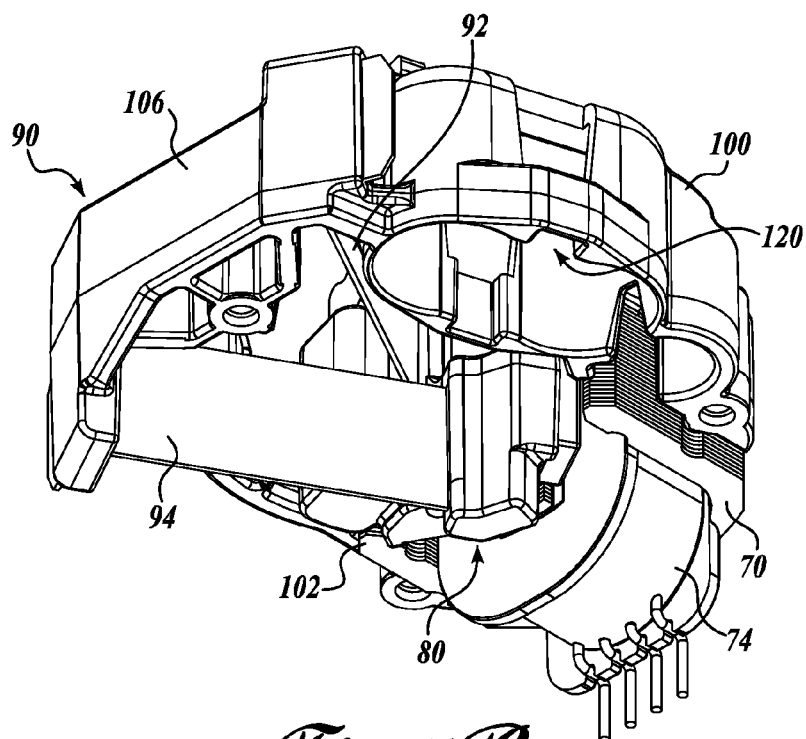
Figure 5C:
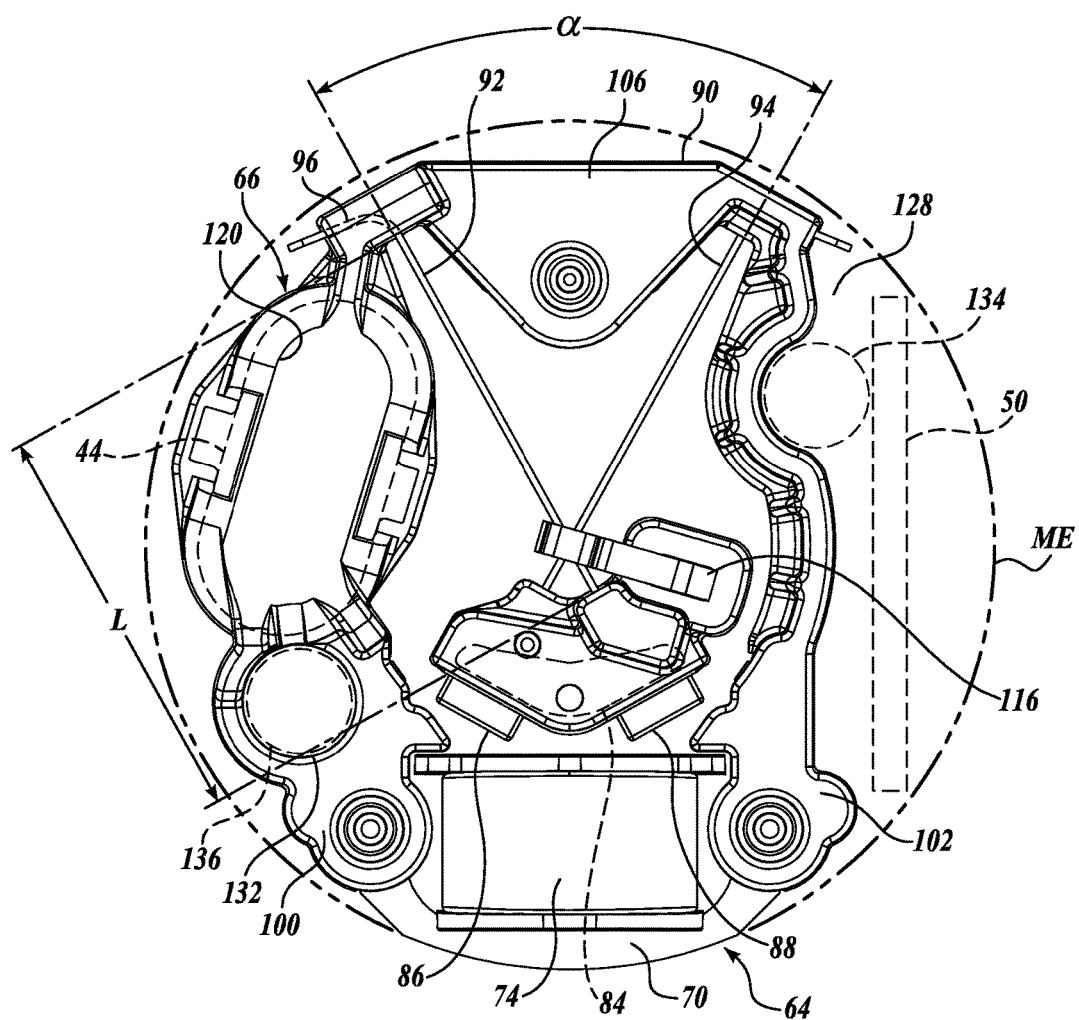
Figure 5D:
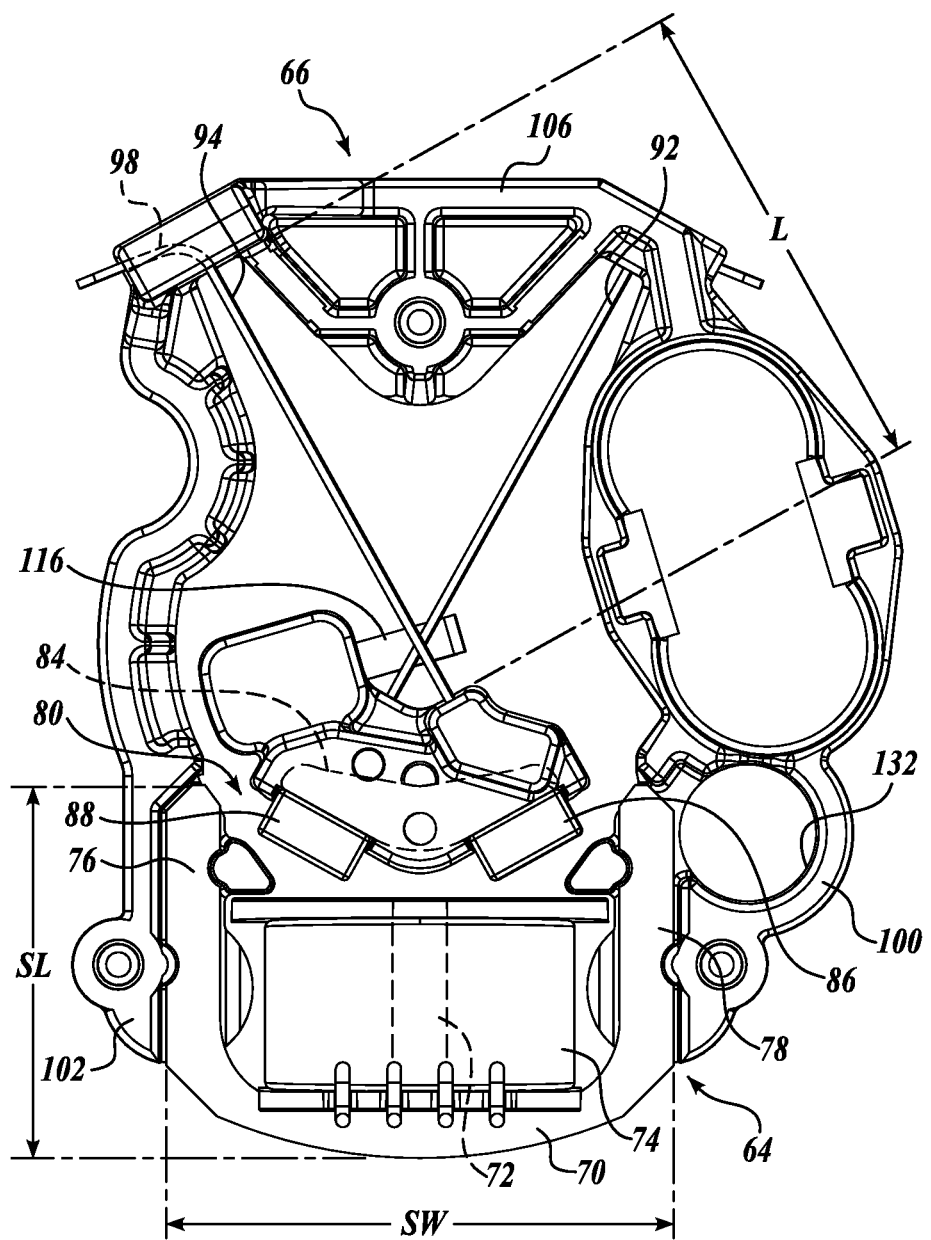
Figure 6A:
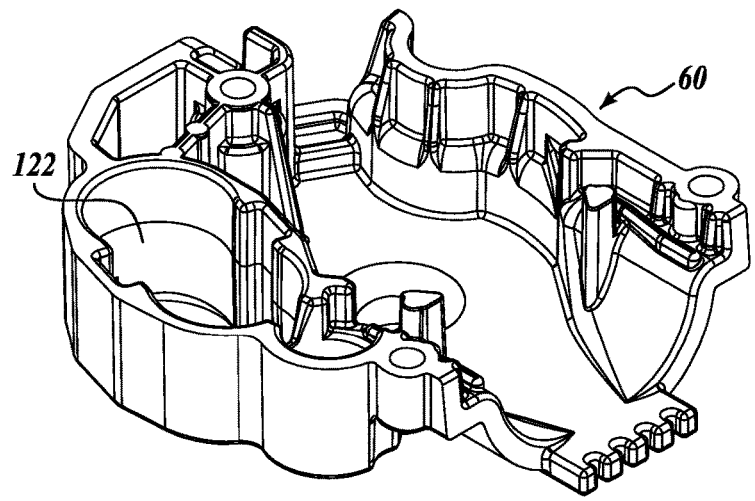
FIGS. 6A-6C illustrate other selected components of the oscillating motor of FIG. 1.
Figure 6B:
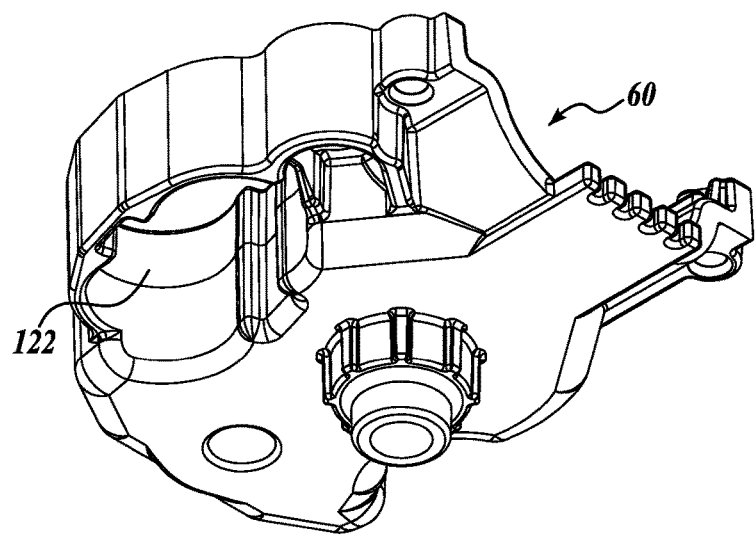
Figure 6C:
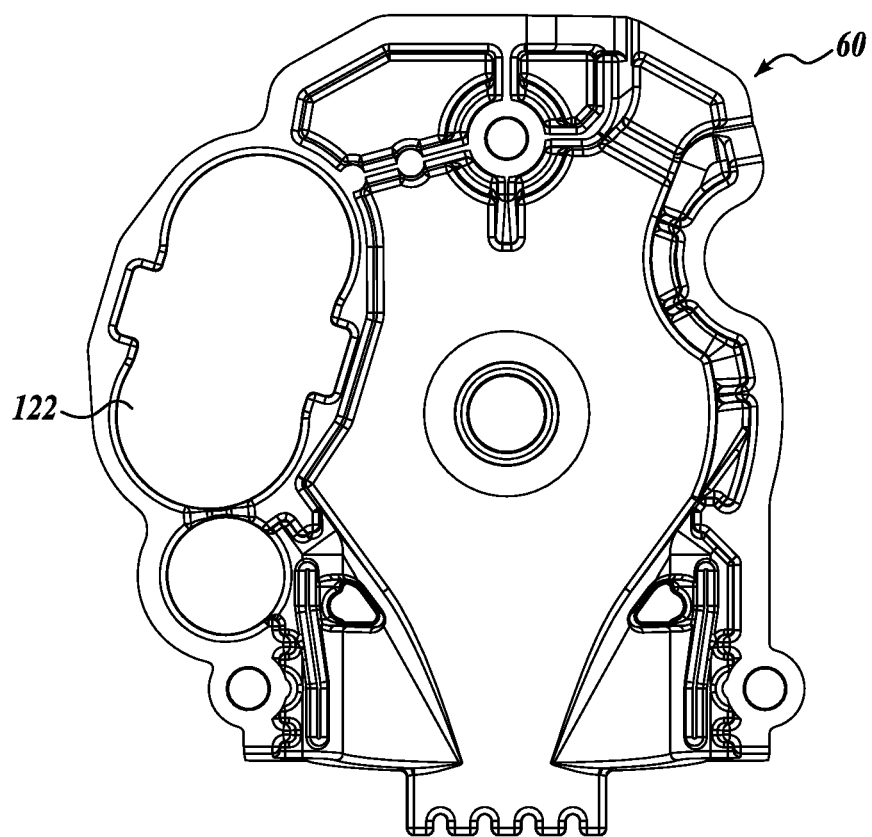

The armature assembly 66 also includes an armature mount 90, which is fixedly secured to the handle base 30 (See FIG. 3) via motor base 60, thus becoming a mechanical reference for the oscillating system. As shown in FIGS. 5C and 5D, the armature 80 is coupled to the armature mount 90 by a pair of fixture elements, shown as flexure elements 92 and 94, in a crossed or "X" configuration. In that regard, the flexure elements 92 and 94 overlap at axis 82 (see FIG. 5A), which is the functional pivot point about which armature 80 oscillates.

Instead of orienting the flexure elements 92 and 94 perpendicular to one another and overlapping at the midpoint of each element like prior art devices, the flexure elements 92 and 94 in the embodiment of FIGS. 5C and 5D are oriented such that: (1) the angle α formed between the flexure elements 92 and 94 is between about 55 degrees and about 60 degrees; and (2) the flexure member 92 crosses the flexure element 94 in an overlapping manner at about $7/8^{th}$ (i.e., 0.875) of the length of each element. In an embodiment, the flexure member 92 crosses the flexure element 94 in an overlapping manner at a point greater than about $8/10$, but less than $9/10$, of the length of each element.

In one embodiment, the angle α formed between the flexure elements 92 and 94 is about 58 degrees. In one embodiment, the flexure elements 92 and 94 are made from spring steel material, and are about 0.016 inches thick and about 0.40 inches high. In one embodiment, the effective length L of each flexure element is about 0.95 inches, which is substantially similar to the motor of U.S. Pat. No. 7,786,626.

By moving the cross point of the flexure elements and selecting the angle α in the range above, additional space, for example, is created within the reduced motor envelope ME for associated components of the appliance, as will be described in more detail below. Additionally or alternatively, to allow the use of flexure elements having an effective length described above but to fit the reduced motor envelope ME (See FIG. 5C), first ends of the flexure elements 92 and 94 in one embodiment are mounted to the armature mount 90 with bent or angled ends 96 and 98, respectively, and second ends of the flexure elements 92 and 94 in this or another embodiment are mounted to the armature 80 with bent or angled ends (hidden in FIGS. 5C and 5D). In one embodiment, the oscillating motor 20 is configured such that the ratio of the effective length L of the flexure elements 92 and 94 to the diameter of the motor envelop is about 0.50 (i.e., 1:2).

In one embodiment, the armature mount 90 includes extensions 100 and 102 that extend from the ends of a cross member 106 outwardly around the flexure elements 92 and 94 and terminate at ends positioned adjacent outer legs 76 and 78 of the E-core 70, as shown in FIGS. 5C and 5D. The bottom surface of extensions 100 and 102 forms an interface that is cooperatively matable with the top peripheral surface of the motor base 60 (See FIGS. 6A-6C). In one embodiment, the motor base 60 is fastened to the armature assembly 66 via removable fastening techniques, such as screws or press fittings, among others. Once mated, a battery socket is formed by aligned openings 120 and 122 formed in the mount extension 100 and the motor base 60, respectively. In one embodiment, the battery socket is positioned within the motor envelope ME and is sized and configured to either receive or retain the battery 44 (see FIG. 5C). In another embodiment, the motor base 60 and the armature mount 90 are also configured to define an additional space 128 within the motor envelope ME to accommodate a printed circuit board 50 having the drive circuit 48 disposed thereon as well as other structure, such as fastener mount 134. In one embodiment, the extension 102 and corresponding structure of the mounting base 60 define a notch as part of the additional space 128 for receiving a component of the appliance 22. The extension 100 also includes an opening 132 for receiving a corresponding fastener mount 136. In one embodiment, the fastener mounts 134 and 136 are used with screws to draw the handle top 36 together with structure associated with the handle base 30.

The armature assembly 66 further includes a mounting arm 116 extending from the side of armature 80. As can be seen in FIGS. 5A-5D, the mounting arm 116 extends outwardly from the armature 80 and then extends horizontally (orthogonal to the pivot axis of the workpiece) until it reaches the axis 82, where the mounting arm 116 extends outwardly again about coaxially with the axis 82. Mounted on the free end of mounting arm 116 is a workpiece, such as the brush head 28 (See FIGS. 2 and 4). The configuration of the mounting arm 116 is thus such that the workpiece oscillates about axis 82, which is parallel to the longitudinal axis of the personal care appliance. In some embodiments, the location/orientation of the mounting arm 116 can be changed, for instance, by moving the location of the tip away from axis 82, to produce a combined rotational/translational movement of the workpiece.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An oscillating motor for a personal care appliance, comprising:
    a stator configured to be connectable to a source of alternating current;
    an armature configured to move about an axis in response to receipt of alternating current by the stator;
    an armature mount;
    a first flexure element having a first end mounted to the armature and a second end mounted to the armature mount; and
    a second flexure element having a first end mounted to the armature and a second end mounted to the armature mount, the first flexure element and the second flexure element coupled between the armature and the armature mount such that the armature moves in an arcuate path about the axis;
    wherein the first flexure element and the second flexure element are overlapped in an X configuration to form an angle between the first end of the first flexure element and the first end of the second flexure element, wherein the angle is between about 55 degrees and about 60 degrees, the first flexure element and the second flexure element each having an effective length (L), wherein the first flexure element crosses the second flexure element at a position that is greater than about 0.8*length (L) of each flexure element.

2. The oscillating motor of claim 1, wherein the first flexure element crosses the second flexure element at a position that is greater than about 0.875*length (L) of each flexure element.

3. The oscillating motor of claim 1, wherein the first end of the first flexure element and the first end of the second flexure element each include an angled end portion mounted to the armature.

4. The oscillating motor of claim 1, wherein the second end of the first flexure element and the second end of the second flexure element each include an angled end portion mounted to the armature mount.

5. The oscillating motor of claim 1, wherein the angle is about 58 degrees.

6. The oscillating motor of claim 1, further including a motor base configured to matably couple with the armature mount, the motor base including an opening aligned with an opening in the armature mount for receiving a battery.

7. The oscillating motor of claim 1, wherein the effective length L of the flexure elements is about 0.95 inches.

8. An oscillating motor for a personal care appliance, the personnel care appliance having a battery, a drive circuit disposed on a printed circuit board and coupled to the battery, the oscillating motor comprising:
a stator configured to be connectable to the drive circuit for receiving alternating current therefrom;
an armature configured to move about an axis in response to receipt of alternating current by the stator;
an armature mount including a cross member and first and second extensions, wherein the first extension includes an opening configured to retain at least a portion of the battery and wherein the second extension includes a notch configured to receive a portion of the personal care appliance; and
a first flexure element having a first end mounted to the armature and a second end mounted to the armature mount; and
a second flexure element having a first end mounted to the armature and a second end mounted to the armature mount, the first flexure element and the second flexure element coupled between the armature and the armature mount such that the armature moves in an arcuate path about the axis;
wherein the first flexure element and the second flexure element are overlapped in an X configuration to form an angle between the first end of the first flexure element and the first end of the second flexure element, wherein the angle is between about 55 degrees and about 60 degrees, the first flexure element and the second flexure element each having an effective length (L), wherein the first flexure element crosses the second flexure element at a position that ranges from about 0.8 L to about 0.9 L of each flexure element.

9. The oscillating motor of claim 8, wherein the first end of the first flexure element and the first end of the second flexure element each include an angled end portion mounted to the armature.

10. The oscillating motor of claim 8, wherein the second end of the first flexure element and the second end of the second flexure element each include an angled end portion mounted to the armature mount.

11. The oscillating motor of claim 8, wherein the effective length L of the flexure elements is about 0.95 inches and the width of the stator is about one (1) inch or less.

12. The oscillating motor of claim 8, wherein the armature mount is configured such that the envelope of the oscillating motor contains the battery and the printed circuit board.

13. A personal care appliance, comprising:
a handle having a longitudinal axis;
a workpiece attachment interface parallel with the longitudinal axis of the handle;
an oscillating motor mounted in the handle and configured to impart an oscillating motion on the workpiece attachment interface;
a battery positioned within the handle; and
a printed circuit board having a drive circuit coupled to the battery and configured to provide power to the oscillating motor,
wherein the oscillating motor includes:
an electromagnet coupled to the drive circuit;
an armature that moves about the longitudinal axis in response to receipt of power by the electromagnet, wherein the armature includes a back iron having two spaced magnets magnetically coupled thereto with the magnetic poles thereof aligned in opposing directions;
an armature mount fixedly secured to the housing; and
a first flexure element having a first end mounted to the armature and a second end mounted to the armature mount; and
a second flexure element having a first end mounted to the armature and a second end mounted to the armature mount, the first flexure element and the second flexure element coupled between the armature and the armature mount such that the armature moves in an arcuate path about the axis;
wherein the first flexure element and the second flexure element are overlapped in an X configuration to form an angle between the first end of the first flexure element and the first end of the second flexure element, wherein the angle is between about 55 degrees and about 60 degrees, the first flexure element and the second flexure element each having an effective length L, wherein the first flexure element crosses the second flexure element at a position that is about 0.875 L of each flexure element.

14. The personal care appliance of claim 13, wherein the effective length L of the flexure elements is about 0.95 inches.

15. The personal care appliance of claim 13, wherein an outer perimeter of the oscillating motor is two inches in diameter or less.

16. The personal care appliance of claim 13, wherein the oscillating motor is configured such that the ratio of the effective length L to the diameter of the outer perimeter is about 0.50.

17. The personal care appliance of claim 13, wherein the electromagnet includes an E-core having first and second outer legs, the length of the E-core is less than about 0.75 inches and the width of the E-core is less than about 1.00 inch, and wherein the effective length L of the flexure elements is about 0.95 inches and the handle has a diameter less than two (2) inches.

* * * * *